United States Patent [19]

Huebler et al.

[11] 4,455,863
[45] Jun. 26, 1984

[54] SONIC DETECTION OF GAS LEAKS IN UNDERGROUND PIPES

[75] Inventors: James E. Huebler, Brookfield; Jeffrey M. Craig, Chicago, both of Ill.

[73] Assignee: Consolidated Natural Gas Service Company, Cleveland, Ohio

[21] Appl. No.: 362,668

[22] Filed: Mar. 29, 1982

[51] Int. Cl.³ .............................................. G01M 3/24
[52] U.S. Cl. .................................... 73/40.5 A; 73/579
[58] Field of Search ...................... 73/40.5 A, 579, 592

[56] References Cited

U.S. PATENT DOCUMENTS

| | | | |
|---|---|---|---|
| 714,775 | 12/1902 | Brown | 73/592 |
| 3,055,209 | 11/1959 | Reid et al. | 73/40.5 A X |
| 3,223,194 | 12/1965 | Michael | 73/592 |
| 3,264,864 | 8/1966 | Reid et al. | 73/40.5 A |
| 3,500,676 | 3/1970 | Palmer | 73/40.5 A |
| 3,592,967 | 7/1971 | Harris | 73/592 |
| 3,955,404 | 5/1976 | Bickel et al. | 73/597 |

OTHER PUBLICATIONS

J. R. Sabo, Detect Buried Steam Leak with Acoustics, Jul. 1976.

Primary Examiner—Gerald Goldberg
Assistant Examiner—Hezron Williams
Attorney, Agent, or Firm—Thomas W. Speckman

[57] ABSTRACT

An apparatus and process for locating gas leaks in underground pipelines by detection of sound waves created by the leaking gas. The apparatus and process uses a sound transducer attached to an elongated probe inserted in the ground for a substantial portion of its length. The elongated probe and transducer combination has an effective mechanical resonant frequency equal to or below the electrical resonant frequency of the sound transducer. The passive sonic detection apparatus and process of this invention provides improved sensitivity for detection of sounds created by leaking gas and thereby more accurate pinpointing of the gas leak in an underground pipeline. In one embodiment acoustic reflection and absorption shielding is provided for reduction of system response to airborne noise.

29 Claims, 4 Drawing Figures

U.S. Patent
Jun. 26, 1984
4,455,863
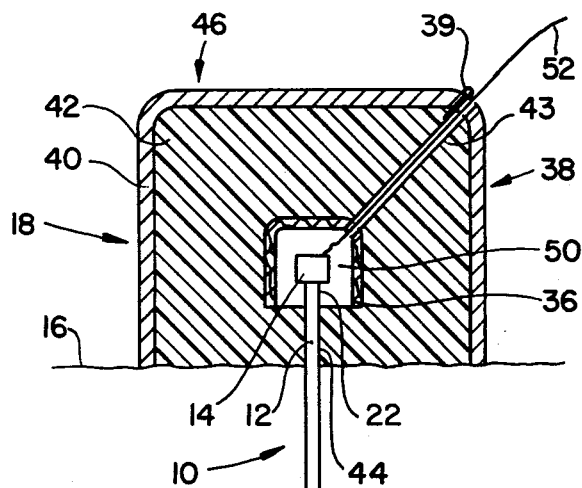
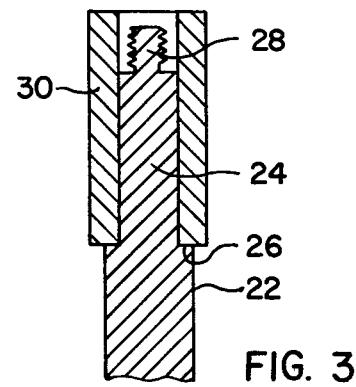
FIG. 3
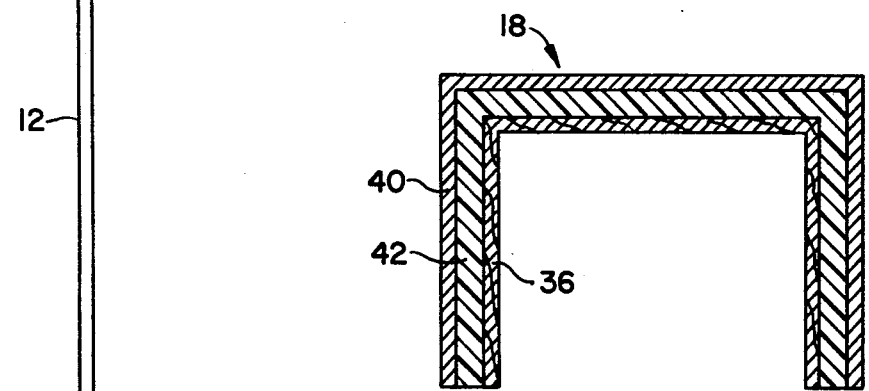
FIG. 2
FIG. 1
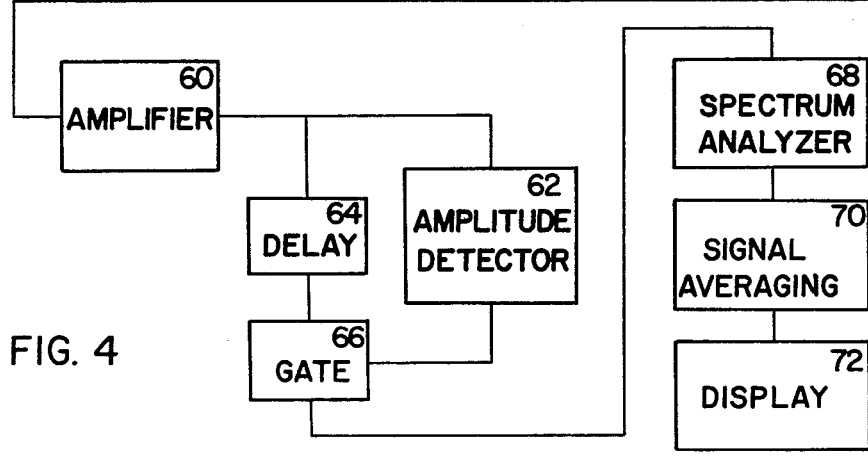
FIG. 4

SONIC DETECTION OF GAS LEAKS IN UNDERGROUND PIPES

BACKGROUND OF THE INVENTION

1. Field of the Invention

This invention relates to an apparatus and process for locating gas leaks in underground pipelines, and more particularly to sound detection apparatus for identifying and measuring sound waves created by leaking gas. The apparatus and process uses a probe-accelerometer combination having an effective mechanical resonant frequency less than or equal to the electrical resonant frequency of the attached accelerometer. This combination increases the sensitivity of the system. In a preferred embodiment, acoustic shielding is used around the portion of the probe which is above ground and the accelerometer, to reduce system response to airborne noise.

Underground natural gas piplines develop leaks which must be identified, located and repaired. Even relatively small leaks, 1/16 inch or less in diameter, may be hazardous, wasteful and expensive, and must be eliminated. Leaks are usually discovered by using a flame ionization detector and pinpointed by taking a series of measurements along a pipeline with a combustible gas indicator. Both of these instruments measure chemical properties of the natural gas. These methods do not always pinpoint the leak resulting in the first excavation not being at the site of the leak, resulting in added time and expense of further excavating. There is a need for more precise leak detection.

The escaping gas from leaks generally create sound waves which may be detected by ground surface sonic detection equipment, but such equipment must be extremely sensitive to respond to the leak sounds. Leaks can be discovered and pinpointed by taking a series of sound measurements along a pipeline with a transducer or the like. The approximate location of a leak is generally beneath the ground where the measured signal is the strongest. The ground in the vicinity of the strongest signal is excavated until the leak is found. Since the size of excavation is closely related to the precision with which the signal is measured and the leak located, it is desirable to accurately locate leaks, as well as to identify them. Thus, there is a need for improved sensitivity in sound detection equipment which identifies and locates gas leaks in underground pipelines.

When the sensitivity of the sound detection equipment is increased, extraneous noise more adversely affects the ability of the equipment to isolate the sound waves generated by leaks. Airborne noise created by vehicular traffic, industrial activity, weather phenomena, and the like, must be attenuated well below the intensity of the sound waves created by the leaks, or eliminated by electronic circuitry.

2. Description of the Prior Art

Sonic leak detectors and leak pinpointers can be divided into two general groups: detectors for leaks of liquid materials and detectors for leaks of gaseous materials. Liquid leaks generally create louder sound waves than gas leaks and high pressure leaks are generally louder than lower pressure leaks.

Previous efforts to improve the sensitivity of sonic detectors and control extraneous noise have not been as successful as desired, particularly for gas leaks. For example, U.S. Pat. No. 4,176,543 teaches electronic gating circuitry for leak detectors in liquid storage tanks to reduce the effect of noise on the detection system. The circuitry identifies noise pulses received in a transducer and eliminates them from the output signal of the detection circuitry. There is no attenuation of the noise before it is detected in the transducer, however, and the sensitivity of the transducer itself is not improved.

U.S. Pat. No. 4,083,229 teaches location of a leak in an underground water pipe by use of spaced detectors in contact with the pipe, such as secured to fire hydrants, stand pipes or the like to improve sensitivity.

U.S. Pat. No. 3,223,194 teaches a sonic vibration locator for detecting leaks in water pipes. The detector has multiple vibration transmitting prongs in a special shaped base and in special arrangement relative to a transducer. The '194 patent teaches four long probes may be used for detecting vibrations in soft top earth. There are no teachings relative to the length or resonant frequencies of the long prongs.

U.S. Pat. No. 3,055,209 teaches an active sonic leak detector for locating leaks in underground gas conduits by transmitting sonic waves through the gas within the conduit and through the leak opening for detection.

U.S. Pat. No. 3,264,864 teaches a sonic leak detector for locating leaks in underground gas conduits wherein a sonic wave of one sonic frequency is transmitted through the gas conduit and a receiving transducer sensitive to a mechanical wave of a sonic frequency transmitted by the gas through the leak. The '864 patent also teaches that by coupling a pair of such transducers, the need for transmission of a sonic signal in the gas may be avoided and the difference in phase relationship of the natural sounds of the leak are used. The '864 patent teaches a transducer having 3 to 6 prongs for contact with the earth. The patent teaches 1 or 2 prongs do not give satisfactory performance and that very long prongs are not desirable, about 5 inches being most satisfactory.

SUMMARY OF THE INVENTION

In one embodiment of this invention, a passive sound detection device for identifying and locating a gas leak in an underground pipeline has a sound transducer attached to a long probe capable of being inserted into the ground, the effective mechanical resonant frequency of the probe-transducer combination being equal to or below the electrical resonant frequency of the transducer. The single long probe may reach closer to the leak providing the sound source and results in improved sensitivity. Electronic means connected to the transducer identifies and measures electric signals generated by sound waves created by gas leaks. Electronic gating is used to minimize some types of background noise. In one embodiment acoustic shielding partially surrounds the sound transducer and the portion of the probe which is above ground providing acoustic shielding for reduction of system response to airborne noise.

Accordingly, an object of this invention is to provide a passive sonic detection apparatus and process for identifying and pinpointing gas leaks in underground pipes.

Another object is to provide sonic leak detection apparatus for underground gas pipelines having improved sensitivity.

Still another object is to provide a transducer secured to a single long sound detection probe, the combination of the probe and transducer having an effective mechanical resonant frequency equal to or below the electrical resonant frequency of the transducer alone.

Still another object is to provide attenuation of airborne noise in leak detection apparatus.

BRIEF DESCRIPTION OF THE DRAWINGS

The above mentioned and other features of this invention and the manner of obtaining them will become more apparent, and the invention itself will be best understood by reference to the following description of preferred embodiments of the invention taken in conjunction with the accompanying drawings in which:

FIG. 1 is a cross-sectional view of one embodiment of the sound detection apparatus of this invention;

FIG. 2 is a cross-sectional view of an alternate embodiment of the acoustic shielding of FIG. 1;

FIG. 3 is a detailed view of the upper portion of a probe with a driving head in position; and FIG. 4 is a schematic block diagram of one embodiment of the electronic circuitry of the sound detection apparatus of this invention.

DESCRIPTION OF PREFERRED EMBODIMENTS

The sound detection device 10 shown in FIG. 1 includes a sound transducer 14, such as an accelerometer, and an elongated probe 12 having one end 20 which is capable of being inserted into the ground, and an opposite end 22 in vibratory contact with the transducer 14. Probe 12 is inserted at least partially beneath the ground 16, and in preferred embodiments, acoustic shielding 18 substantially surrounds sound transducer 14 and the portion of probe 12 which is above ground 16.

Sound transducer 14 may be chosen from many commercially available sonic transducer devices, such as accelerometers. The sound transducer should be chosen for high sensitivity, low thermal noise, and a desired resonant frequency. Suitable resonant frequencies are about 500 Hz to about 10,000 Hz, about 1000 to about 5000 Hz being preferred. In a sound detection device actually made and tested, the accelerometer was a Shure Bros. Model No. 62CP, having a resonant frequency of up to about 4,000 Hz.

Probe 12 may be any long rod-like shape, such as a generally round shaft one-half inch in diameter, or some other suitable shape such as polygonal, and may be any suitable material for vibratory transmission, such as mild steel. The probe may be of any material having sufficient rigidity, such as metals, plastics such as expoxies, nylon and glass fiber reinforced nylon. Metallic probes are preferred. It is preferred that the probe be relatively thin so that it may be readily inserted in and removed from the ground. The probe is sufficiently long so that the combination of the probe and transducer have an effective mechanical resonant frequency equal to or below the electrical resonant frequency of the transducer. In using a long probe, the end of the probe extends closer to the pipeline and leak.

Lower probe end 20 may be pointed or other suitable shape to more easily pierce the ground. In one embodiment, the upper probe end 22 may be provided with a reduced portion 24, as seen in FIG. 3, shoulders 26 where the reduced portion 24 meets the body of the probe, and threaded portion 28 at the upper end of the reduced portion for securement of the transducer 14.

Various methods may be used in inserting the probe into the ground. According to one method, driving head 30 may be slid over reduced portion 24 contacting shoulder 26 and covering threaded portion 28. Probe 12 may be driven into the ground 16 by hitting driving head 30 with a hammer or sledge or other driving mechanism. It is preferred that when driven into the ground no more than about 20 percent of the length of the probe be exposed above the ground.

The resonant frequency of probe 12 is determined by its length and cross-sectional area, as well as the elasticity and density of the material of the probe. It is preferred that the probe be a thin shaft having less than about a 1 inch diameter, preferably about $\frac{3}{8}$ to about $\frac{3}{4}$ inch. The length of the probe is selected to produce a combined mechanical resonant frequency which is less than or equal to the electrical resonant frequency of the accelerometer alone. The probe is preferably at least 30 inches long, about 30 to about 45 inches being preferred. In a probe actually made, tested and used to pinpoint gas leaks, the total length was about 37.5 inches, which included a reduced portion 24 about 3 inches long, and a point on end 20 about 1 inch long. The mechanical resonant frequency of this probe itself was about 2,700 Hz, and the effective mechanical resonant frequency of the combination of the probe and accelerometer was about 2,430 Hz while the electrical resonant frequency of the accelerometer was about 4,500 Hz.

The resonant frequency of prior art attachments for transducers such as multiple short probes, is much higher than the resonant frequency of the transducer, and may be above about 30,000 Hz, with the accelerometer attached to such short probe. The poor response of the short probes at the resonant frequency of the transducer does not enhance the response of the transducer, increasing the difficulty of leak detection. The long probe of this invention, providing a combined mechanical resonant frequency with the transducer equal to or below the electrical resonant frequency of the transducer, allows the transducer to vibrate more strongly, and thus, the sound detection device is more responsive to the sounds created by a leak.

The response of the transducer is further enhanced because the probe extends much closer to the pipe than prior transducer attachments. This is significant because sound waves originating at a leak in the ground attenuate rather rapidly. Thus, the sensitivity of the sonic detection device of this invention is increased because the combined mechanical resonant frequency of the probe with its accelerometer is at or below the electrical resonant frequency of the accelerometer itself and because the probe extends close to the buried pipeline.

In leak detection experiments made in sand, 15 psig gas leak signals were measured 31.5 inches from the leak. It was found that a 1.25 inch long probe attached to a transducer did not detect leak signal frequencies above about 2,000 Hz, while a 37.5 inch probe according to this invention did detect the high frequency components of the leak signal in addition to the lower frequency components.

Two embodiments of the acoustic shielding 18 are shown in FIGS. 1 and 2. The shielding 18 rests on ground 16 after installation, covering sound detection device 10 so that undesired airborne noises are at least partially reflected or absorbed by the shielding 18, reducing the response of the sound detection device to the airborne noise. Airborne noises are more significant when using the sound detection device of this invention due to the increased sensitivity of the sound detection device. Either embodiment may be of any desired shape, such as cylindrical or rectangular, to provide desired enclosure of transducer 14.

Shielding 18 shown in FIG. 1, includes outer shell 40 and insulation 42 extending around the inside of shell 40. Outer shell 40 is preferably a sound reflecting material, such as a metallic material such as lead. Insulation 42 includes orifice 44 which is large enough to surround probe 12, but not large enough to pass over transducer 14, which has a greater cross-sectional area than that of the probe. An expanded opening 50 is provided in insulation 42 for transducer 14.

Side portion 38 is hingedly connected to top portion 46 by hinge 39, and additional insulation may be provided to fit transducer 14 within expanded portion 50. The inside of expanded portion 50 may be structurally supported by inner shell 36 which may be wood or metal. When structurally self-supporting plastic foam is used for insulation 42, inner shell 36 may not be necessary. Hole 43 may be provided for electrical lead 52 from the transducer to associated electronics.

In the embodiment of FIG. 2, shielding of 18 comprises inner shell 36. Surrounding and secured to the outside of inner shell 36 is sound insulation 42, and secured to insulation 42 is outer shell 40 of sound reflecting lead sheet or other suitable material. Shielding 18 may be a cube, a rectangular box, spherical form or any other suitable shape. Insulation 42 may be fiberglass, polymeric foam or other suitable material, and may be from about 1 inch up to about 9 inches thick. Inner shell 36 is generally wood or some other suitable structurally supporting material. While many sizes would be suitable for shielding 18, it is suggested that a cubicle shape having outside dimensions of about 18 inches in height, depth and width be used to produce acceptable results.

In the embodiment shown in FIG. 2, shielding 18 may be easily placed over the sound detection device 10 after probe 12 is inserted in the ground and the transducer 14 is installed on probe 12. It is estimated that the acoustic shielding 18 of FIG. 2 may provide a transmission reduction of about 40–50 dB.

In the embodiment shown in FIG. 1, probe 12 is first inserted into ground 16 for a substantial portion of its length toward pipeline 78 having hole 76 with leaking gas. Acoustic shielding 18 is installed around probe 12 with the hinged top 46 open. Transducer 14 is installed on threaded portion 28 of probe 12. After attaching the electrical lead 52 to transducer 14, hinged top 46 is closed. In this manner, the sound detection device 10 is isolated from airborne noises. The design is particularly useful on irregular ground because it generally provides isolation around the entire periphery of the sonic detection device under such adverse conditions. It is anticipated that shielding 18 of FIG. 1 may provide a transmission reduction of about 40–50 dB.

The sonic detection device produces an electrical signal which is measured and analyzed in the associated circuitry shown in FIG. 4. The detection device responds to leak sounds, low-level noise including thermal noise, airborne noise and the like, and large noise pulses which may be emitted by traffic and the like. While low-level airborne noise may be significantly attenuated by the acoustic shielding of this invention, large noise pulses may travel through the ground as well as the air, and are not sufficiently attenuated by the shielding. Such pulses may create false readings in the detection circuitry and must be controlled. Noise control is particularly important in this invention because the sound detection device is so sensitive that it may respond to disturbances which are relatively far away and which would not affect prior art sonic detectors.

Leak signals are generally identified by electrically averaging the output of the sonic detection device, and recording relative increases in the average output. Large noise pulses raise the average output of the detection device, creating the false impression that a leak has been detected. The circuitry of this invention eliminates many of the large noise pulses by gating them out of the signal before the signal is averaged.

A low noise 60–80 dB pre-amp 54 is connected to sound detection device 10 through wires 52, and is preferably located inside of acoustic shielding 18. Lead wires 52 may extend beneath the acoustic shielding, or between the top and side of the shielding, as shown in FIG. 1. The pre-amp may also be located inside the shielding, if desired.

The output of the pre-amp 54 is generally processed through equipment installed in a nearby truck or other vehicle, and enters the vehicle and additional electronic circuitry of FIG. 4 through coaxial cable 56.

The signal passes through high-pass filter 58, which minimizes 60 Hz electrical noise and low frequency background noise. The signal is then amplified in amplifier 60, which provides up to about 40 dB of amplification, depending on the strength of the leak signal. Amplifier 60 typically operates at about 20 dB.

The output of amplifier 60 is fed into both signal amplitude detector 62 and delay circuitry 64. The signal is analyzed in the detector 62 as it simultaneously passes through delay circuitry 64. If the detector 62 determines that the signal is greater than a predetermined magnitude, and is therefore probably noise, the detector 62 closes gate 66 for a pre-set period of time, to eliminate the undesired signal. If the signal returns to an acceptable level, and remains acceptable for the pre-set period of time, the gate is opened and the signal passes to the ensuing circuitry.

The refined signal may undergo spectrum analysis in analyzer 68, where the spectrum is analyzed for unusual phenomena, and is averaged in signal averaging circuitry 70. Various averaging methods, such as measurement of time averaging total signal strength or signal strength in selected frequency bands, may be used, as desired.

The output voltage of signal averaging circuitry 70 is displayed in any suitable manner through display circuitry 72, to identify and measure leak signals. After a leak is identified, its location may be determined by making several measurements along the pipeline 78. In most cases, the location of the leak will be beneath the probe location where the leak signal is the strongest.

Two or more sound sensors can be used including a control sensor which may be positioned a distance from the underground gas pipe so that leak signals would not be heard by the control sensor. The control sensor would respond only to background signals. In this manner the control sensor may be used to control the electronic gating for leak signals. Two or more sound sensors may also be used by placing multiple sensors along the route of the underground gas pipe to electronically determine the position of the strongest leak signal and thus more quickly determine the leak location.

Other types of electronic circuitry known to the art will be apparent upon reading this disclosure and may be used. Sensitivity of the sound detection system is increased because the effective mechanical resonant frequency of the combination of the probe and accelerometer is equal to or below the electrical resonant frequency of the accelerometer itself. Sensitivity of the sound detection system is also increased by the end of the probe being closer to the leak. Also, the acoustic shielding reduces airborne noise.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A sound detection device for locating gas leaks in underground pipelines comprising:
   a sound transducer; and
   an elongated probe having one end which is capable of being inserted in the ground for a substantial portion of the length of said probe, and an opposing end secured to said transducer above the ground;
   said probe and said sound transducer having a combined effective mechanical resonant frequency equal to or below the electrical resonant frequency of said transducer.

2. The sound detection device of claim 1 wherein said transducer comprises an accelerometer.

3. The sound detection device of claim 1 wherein said transducer has a resonant frequency of about 500 Hz to about 10,000 Hz.

4. The sound detection device of claim 2 wherein said transducer has a resonant frequency of about 1000 Hz to about 5000 Hz.

5. The sound detection device of claim 1 wherein said probe is less than one inch in cross section diameter and at least 30 inches in length.

6. The sound detection device of claim 1 wherein said probe is a shaft about ⅜ to about ¾ inch in diameter and about 30 to about 45 inches long.

7. The sound detection device of claim 1 wherein said probe comprises a point at said one end of said probe.

8. The sound detection device of claim 1 wherein said probe comprises a reduced portion on said opposing end of said probe, a shoulder where said reduced portion joins said probe, and a threaded portion on said reduced portion for securement of said transducer.

9. The sound detection device of claim 8 comprising a driving head which fits over said reduced portion, extending to said shoulder, and covering said threaded portion, said driving head providing a surface by which said device may be driven into the ground.

10. The sound detection device of claim 1 having acoustical shielding comprising:
    a outer sound reflecting shell spaced from and enclosing said transducer and having sound insulation extending around the inside of said sound reflecting shell.

11. The sound detection device of claim 10 wherein said insulation comprises polymeric foam.

12. The sound detection device of claim 10 wherein said outer sound reflecting shell comprises a metallic material.

13. The sound detection device of claim 10 wherein said transducer has a greater cross-sectional area than that of said probe; and
    said outer sound reflecting shell comprises one or more contiguous sides; said sound insulation extending around the inside of said outer sound reflecting shell has an orifice large enough for said probe but not large enough for said transducer; said sound insulation also having an expanded opening above said orifice for said transducer; said sound insulation having tapered walls extending from the top of said outer sound reflecting shell toward the top of said expanded opening; a top which may be secured to said contiguous sides, said top having sound insulation adjacent said tapered walls and said expanded opening; and said outer reflecting shell comprising lead sheet material.

14. The sound detection apparatus of claim 1 additionally comprising electronic means for measuring the output of said transducer and identifying the output due to gas leaking from an underground pipeline.

15. In a sound detection device for locating gas leaks in underground pipelines of the type having a sonic transducer and a sonic detection attachment secured to said transducer, the improvement comprising said attachment being a single elongated probe having in combination with said transducer an effective mechanical resonant frequency equal to or below the electrical resonant frequency of said transducer, one end of said probe adapted for insertion into the ground and an opposing end of said probe adapted for securement to said transduced.

16. The sound detection device of claim 15 wherein said transducer comprises an accelerometer.

17. The sound detection device of claim 15 wherein said transducer has a resonant frequency of about 500 Hz to about 10,000 Hz.

18. The sound detection device of claim 15 wherein said transducer has a resonant frequency of about 1000 Hz to about 4000 Hz.

19. The sound detection device of claim 15 wherein said probe is less than about 1 inch in cross section diameter and at least 30 inches in length.

20. The sound detection device of claim 15 wherein said probe is a shaft about ⅜ to about ¾ inch in diameter and about 30 to about 45 inches long.

21. The sound detection device of claim 15 wherein said probe comprises a point at said one end of said probe.

22. The sound detection device of claim 15 wherein said probe comprises a reduced portion on said opposing end of said probe, a shoulder where said reduced portion joins said probe, and a threaded portion on said reduced portion for securement of said transducer.

23. The sound detection device of claim 22 comprising a driving head which fits over said reduced portion, extending to said shoulders, and covering said threaded portion, said driving head providing a surface by which said device may be driven into the ground.

24. A process for locating gas leaks in underground pipelines comprising the steps of:
    inserting an elongated probe into the ground above said pipeline for a substantial portion of the length of said probe, leaving one end of said probe exposed above the ground;
    securing a sound transducer to said exposed end of said probe, the combination of said probe and transducer having an effective mechanical resonant frequency equal to or below the electrical resonant frequency of said transducer;
    analyzing the electrical output signal of said transducer to identify a leak; and repeating the process in a plurality of additional points in the ground above said pipeline to ascertain the strongest output signal to locate said leak.

25. The process of claim 24 comprising the step of placing acoustic shielding over said transducer and said exposed end of said probe.

26. The process of claim 24 using gating to reduce background noise.

27. The process of claim 24 wherein a plurality of probes are inserted along the route of said underground pipeline and the position of the strongest output signal identified.

28. The process of claim 24 wherein a control probe is inserted a distance from said underground pipeline, the output signal of said control probe controlling electronic gating for leak signals.

29. The sound detection device of claim 10 wherein said insulation comprises fiberglass.

* * * * *